US009584625B2

(12) United States Patent
Fowler et al.

(10) Patent No.: US 9,584,625 B2
(45) Date of Patent: Feb. 28, 2017

(54) WEB BASED SYSTEM USING EVENTS AND PUSHED WEB CONTENT TO INTERACT WITH REMOTE USERS FOR NOTIFICATIONS AND DATA COLLECTIONS

(75) Inventors: David A. Fowler, Austin, TX (US); Mark Ingalls, Rapid City, SD (US); Kelby R. Kleinsasser, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 425 days.

(21) Appl. No.: 13/544,638

(22) Filed: Jul. 9, 2012

(65) Prior Publication Data

US 2013/0179493 A1  Jul. 11, 2013

Related U.S. Application Data

(60) Provisional application No. 61/505,662, filed on Jul. 8, 2011.

(51) Int. Cl.
*G06F 15/16* (2006.01)
*H04L 29/06* (2006.01)
*H04L 29/08* (2006.01)
*H04W 4/02* (2009.01)

(52) U.S. Cl.
CPC .............. *H04L 67/42* (2013.01); *H04L 67/12* (2013.01); *H04L 67/16* (2013.01); *H04L 67/22* (2013.01); *H04L 67/327* (2013.01); *H04W 4/02* (2013.01)

(58) Field of Classification Search
CPC ....... H04L 67/42; H04L 67/327; H04L 67/16; H04L 67/12; H04L 67/22; H04W 4/02
See application file for complete search history.

(56) References Cited

U.S. PATENT DOCUMENTS

| 7,272,538 B2* | 9/2007 | Baker .................... G01D 9/005 702/186 |
| 2005/0176449 A1* | 8/2005 | Cui ........................ H04L 12/587 455/466 |
| 2006/0250281 A1* | 11/2006 | Mahoney ................. G08G 1/20 340/988 |
| 2010/0318392 A1* | 12/2010 | Cassels .................. G06Q 10/06 705/7.12 |
| 2011/0035059 A1* | 2/2011 | Ersavas .................... A01G 1/00 700/276 |
| 2011/0307119 A1* | 12/2011 | Basir ...................... G07C 5/008 701/1 |

\* cited by examiner

*Primary Examiner* — Moustafa M Meky
*Assistant Examiner* — Kidest Mendaye
(74) *Attorney, Agent, or Firm* — Schwegman Lundberg & Woessner, P.A.

(57) ABSTRACT

In a system and method for a web based system using events and pushed web content to interact with remote users for notifications and data collections operations may be performed including receiving, from a computing device, event data concerning a job being performed by a piece of agricultural equipment wherein the event data includes an identifier associated with the agricultural equipment. A database may be queried to determine a subscriber associated with the identifier. The event data may be transmitted to a network address associated with the subscriber. A response message may be received from the subscriber and forwarded to the computing device. The computing device may connect with the subscriber via a web application address included in the response message.

19 Claims, 5 Drawing Sheets

US 9,584,625 B2

WEB BASED SYSTEM USING EVENTS AND PUSHED WEB CONTENT TO INTERACT WITH REMOTE USERS FOR NOTIFICATIONS AND DATA COLLECTIONS

RELATED APPLICATIONS

This patent application claims the benefit of priority, under 35 U.S.C. §Section 119(e), to Fowler, U.S. Provisional Patent Application Ser. No. 61/505,662, titled "WEB BASED SYSTEM USING EVENTS AND PUSHED WEB CONTENT TO INTERACT WITH REMOTE USERS FOR NOTIFICATIONS AND DATA COLLECTIONS" filed on Jul. 8, 2011, which is incorporated by reference herein in its entirety.

TECHNICAL FIELD

Example embodiments of the present application generally relate to event based notifications systems, and more particularly, to a web based system using events and pushed web content to interact with remote users for notifications and data collections.

BACKGROUND

Computers on modern precision agricultural equipment may monitor multiple readings of the equipment while completing a job. For example, the fuel-level of the equipment and the rate of chemical being applied may both be monitored by the computer. When a job is completed, an equipment operator may then contact someone to obtain the next job. However, this creates a disjointed process in which the information being collected by the computer is not easily accessible to third-parties that may have an interest in how the equipment is doing while on the job as well as provide information to the operators before, during, or after a job.

BRIEF DESCRIPTION OF THE DRAWINGS

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Figure 1:
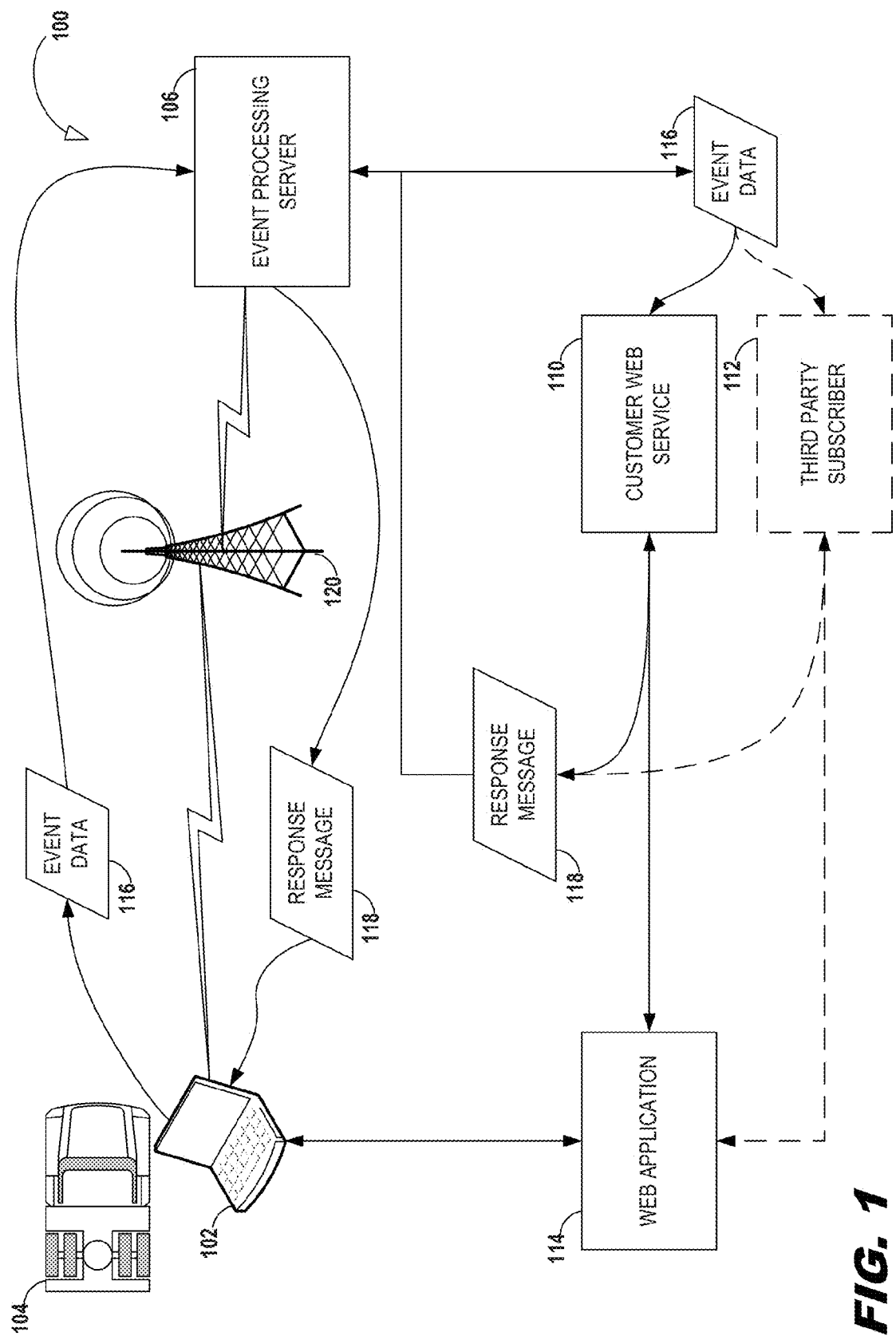
FIG. 1 is a network system depicting, according to some embodiments, a client-server architecture configured for exchanging event data over a network between one or more devices.

FIG. 1 is a network system 100 depicting, according to some embodiments, a client-server architecture configured for exchanging event data over a network between one or more devices. For example, network system 100 may be an event driven messaging system where one or more clients may communicate and exchange event data 116 within network system 100. The data may pertain to various jobs being performed with/by agricultural equipment (e.g., an application of a chemical to a field). One or more subscribers may receive the event/job data and transmit information about the job back to the equipment. Although illustrated herein as a client-server architecture as an example, other embodiments may include other network architectures, such as a peer-to-peer or distributed network environment.

A data exchange platform, in an example form of an event processing server 106, may provide server-side functionality, via a network 120, to one or more devices (e.g., computing device 102, customer web service 110, third party subscriber 112).

Network 120 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 120 may include a single local area network (LAN) or wide-area network (WAN), or combinations of LAN's or WAN's, such as the Internet. The various devices coupled to network 120 may be coupled to network 120 via one or more wired or wireless connections Computing device 106 may by associated with agricultural equipment 104. Agricultural equipment 104 may include but is not limited to industrial/farm equipment such as tractors, sprayers, planters, harvesters, and pickup trucks used in field services. In an embodiment, associated may mean computing device 106 is integrated as an onboard computing device or located within agricultural equipment 104. In an embodiment, computing device 106 is a remote mobile computing device that controls a field work system, such as a computer used to guide a tractor in parallel swaths and/or control the application of fertilizer. In an embodiment, a field is a location where work (e.g., a job) is preformed such as where an agricultural crop is produced and services such as chemical application is performed. While this illustrative embodiment pertains to a computing device associated with agricultural equipment, the invention is not limited to use in the agricultural industry. For example, the invention may be used in the construction industry with computing devices associated with various types of construction equipment.

In various embodiments, computing device 102 includes at least one processor, output device, network interface, input device, and location device. The display may be a touchscreen or non-interactive display. The network interface may be configured to transmit and receive on multiple frequencies (e.g., 4G, 3G, 802.11, etc.) over network 120 with event processing server 106 and web application 114. The input device may be a keyboard, touchscreen, gesture capture, stylus or a combination thereof. In various embodiments, computing device 102 also includes one or more applications (e.g., sets of instructions) that are executed by the at least one processor. The executed applications may be configured to perform the functions and methods described herein. The location device may be a GPS unit that receives coordinate data from one or more satellites. In an embodiment, the location device approximates location based on known locations of cellular or 802.11 access points.

In various embodiments, event processing server 106 acts as a messaging exchange server between computing device 102 and customer web service 110 and/or third party subscriber 112. For example, computing device 102 may transmit event data 116 indicating equipment 104 has begun a job to event processing server 106. Event processing server 106 may then transmit the event data 116 to one or more of customer web service 110 and third party subscriber 112 based on entities that have subscribed to receive event data from computing device 102. In some embodiments, a customer (e.g., the owner of equipment 104) authorizes the entities to receive event data 116. There may be more than one third-party subscriber. In an embodiment, a third-party subscriber is entity or add-on that provides data or features to computing device 102.

A response message 118 may be generated from one or more of customer web service 110 and third-party subscriber 112 and transmitted back to event processing server 106. Event processing server 106 may then transmit response message 118 to computing device 102. In various embodiments response message 118 includes a URL to web application 114 (e.g., web page). Thus, computing device 102 may communicate with customer web service 110 and third-party subscriber 112 without going through event processing server 106. In this manner, third-party subscribers may interact with an operator of equipment agricultural equipment 104, but the third-party subscribers are not given direct access to the data being collected on computing device 102 or control of equipment 104.

In various embodiments, event data 116 and response messages 118 are messages that identify information concerning a job or piece of equipment. Each message may have an event type. Event types may include, but are not limited to, equipment events, job events, environmental events, web page events, and job web page events. In various embodiments, subscribers may subscribe to one or more event types or specific events.

Equipment events, job events, and environmental events may flow from computing device 102 to event processing server 106 and then to customer web service 110 or third-party subscriber 112 (e.g., event data 116). These events may also include an identifier (e.g., textual or numerical string) of equipment 104 or computing device 102 for use in determining which subscribers should receive the event data. Web page events and job web page events may flow from customer web service 110 or third-party subscriber 112 to event processing server 106 back to computing device 102 (e.g., response message 118).

Equipment events may include information concerning the status of the equipment such as an operator's intention to power on, power off, and fuel tank levels. Job events may include job start events, job pause events, and job end events. In an embodiment, a job event may also include an identification number of a job being performed. Environmental events may refer to location information (e.g., coordinates of equipment 104). Collectively, equipment events, job events, and environmental events may be considered field events.

In an embodiment, a web page event includes a URL that the sender (e.g., third-party subscriber 112) wants to be displayed to an operator of equipment 104. Displayed may mean having computing device 102 establish a connection to the URL and display its contents on a display device. The information at the URL may include guidance related to the job being performed by equipment 104 such as indicating there is a swamp in the northwest corner of a field location. In various embodiments, a web page event also includes a priority level. Depending on a threshold or other criteria (e.g., a job is in progress) the computing device 102 may choose to delay or not display the URL.

In an embodiment, a job web page event also includes a URL that the sender want displayed to an operator, however, the web page at the URL may be interactive. For example, a third-party subscriber may want manual data entry of information by the operator immediately after a job has started. Before beginning a job, the operator may enter in the information that is then transmitted back to the third-party subscriber.

Computing device 102 may be configured to monitor (e.g., access sensor or other onboard computer data) agricultural equipment 104 and the status of jobs being performed with the equipment to determine when to send event data 116. For example, an operator of equipment 104 may indicate his/her intention to begin a job via an input device of computing device 102. At this point, computing device 102 may be transmit event data 116 identifying the equipment 104, computing device 102, and a job identification of the job to be performed.

Different criteria may trigger different events and subsequent event data messages. For example, an event data message may be sent when a fuel sensor indicates there is less than 10% of fuel remaining. Event data may also be sent periodically regardless of triggers. For example, every five minutes location data and rate of chemicals being applied of equipment 104 may be sent as event data.

Figure 2:
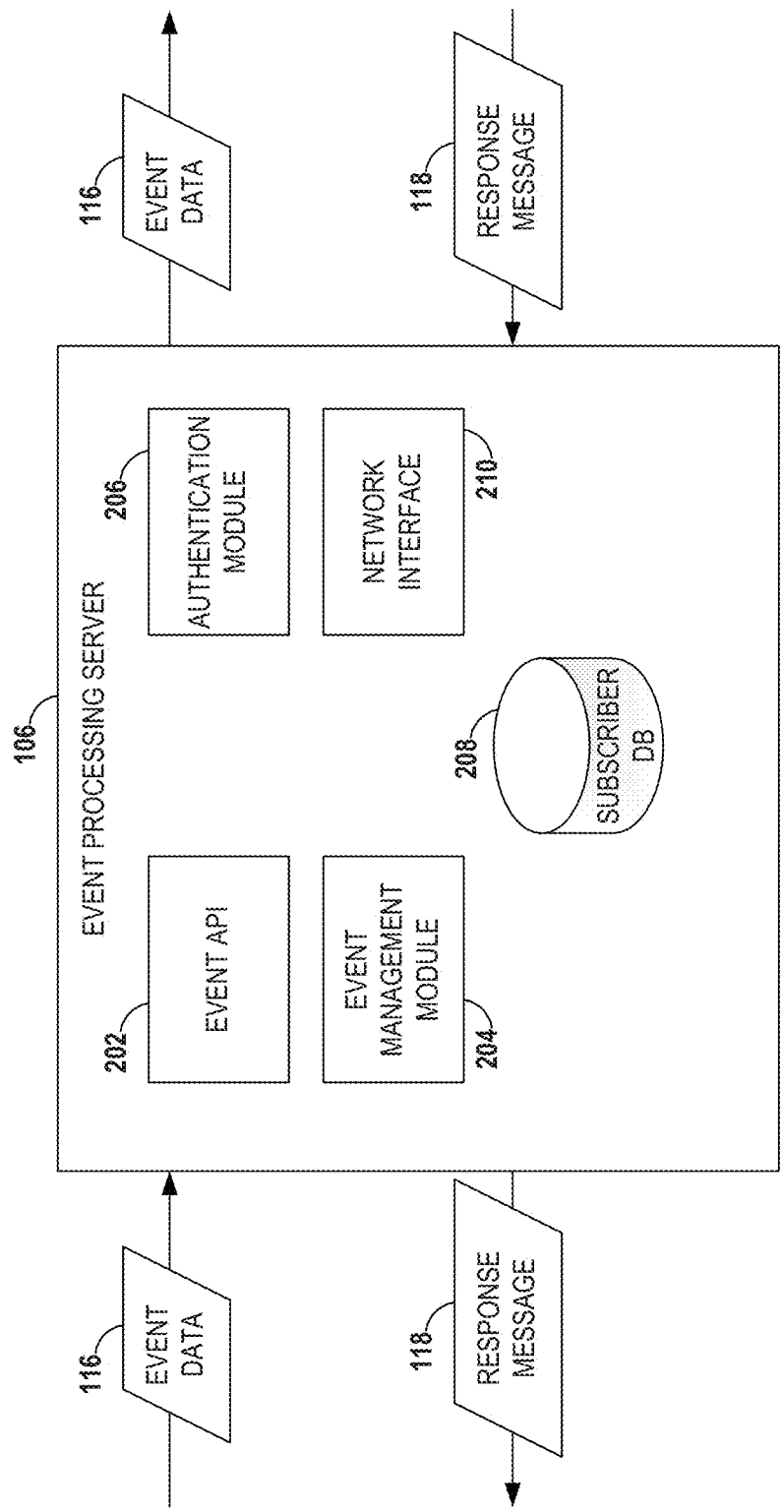
FIG. 2 is a block diagram illustrating an event processing server, according to some example embodiments.

FIG. 2 illustrates a block diagram of event processing server 106, according to some embodiments. While illustrated as a single server, event processing server 106 may comprise a plurality of servers distributed across multiple geographic areas. Similarly, the components illustrated within event processing server 106 may operate or exist on one or more servers. Event processing server 106 may include event API 202, event management module 204, authentication module 206, subscriber database 208, and network interface 210.

In an embodiment, event management module 204 processes information included within event data 116 that has been received using network interface 210. Processing may include unencrypting event data 116 if necessary and parsing the information. The information may include one or more of the following, event type, event payload, job identification, equipment identification, and computing device identification. The event payload may be the information related to the event type. For example, if the event type is an environmental type, the payload may include the coordinates of the equipment. Some event data may not have a payload as the event type is the information (e.g., job start event).

In various embodiments, event management module 204 provides an interface (e.g., webpage) to configure/initialize equipment 104 such that customers and third-parties can subscribe to event data for the equipment. For example, a customer may login to event processing server 106 and input the identifiers of the equipment 104 and computing device 102 owned by the customer. For each equipment piece or computing device, an interface may be provided to the customer that lists the various event data types available and which third-parties should receive event data associated with the event types. Furthermore, the customer may enter in the URLs associated with the third-party for use in sending the event data to the subscriber.

In an embodiment, subscriber database 208 is a flat-file or relational database, however, any storage arrangement may be used (e.g., No-SQL systems or couchDB). Subscriber database 208 may include one or more data entries that associate one or more of an equipment identifier, job identifier, computing device identifier, and event types with one or more customers or third parties. Additionally, subscriber database 208 may store entries that associate a customer or third party with a URL. As an example, subscriber database 208 may have an entry that third-party "Corp A." is subscribed to job start events for equipment identifier "1423." Subscriber database 208 may represent the information entered by the customer using event management module 204.

In various embodiments, subscriber database 208 further stores an indication of whether a customer (e.g., an owner/manager of equipment 104) has authorized a third-party to receive event data for equipment 104. For example, subscriber database 208 may store one or more authentication keys (e.g., tokens, verification codes) for a customer. When a request is made, from a third-party, to send a response message (e.g., a URL) to computing device 102 the third-party will include their authentication key.

In an embodiment, authentication module 206 compares the authentication key received from the third-party with the authorized authentication keys associated with the customer. If there is a match, the response message is forwarded to computing device 102. If no match is found, a request may be sent to the customer (e.g., e-mail) to determine if the unauthorized third-party requester should be allowed to communicate with computing device 102.

In various embodiments, authentication module 206 provides an interface (e.g., web page) to a customer to enter in authorized third-parties for each piece of equipment or computing device under the customer's control. In some embodiments, authentication module 206 generates the authorization keys for the authorized third-parties for the customer. The customer may revoke authorization for a third-party at any time via the interface. Entries within subscriber database 208 may be updated according to the authorizations made by the customer.

Referring back to event management module 204, processing of event data 116 may include querying subscriber database 208 to determine where to forward the event data. Querying may include using the event type, job identification, equipment identification, or computing device identification as an input to the database. The results of the query may indicate the subscribers (third-party of customer web services) event data 116 is to be forwarded to.

Using the URL associated with a subscriber, as stored in the subscriber database, event API 202 may format a request (e.g., HTTP POST) to the URL. In an embodiment, the request may include header information that identifies the originating computing device (e.g., computing device 102). The request may be formatted according to a standardized format (e.g., name value pairs) such that the subscriber can parse the information included in the request. In an embodiment, the request is encrypted.

In an embodiment, event application programming interface (API) 202 is further configured to listen for response messages received via network interface 210 from one or more subscribers. In an embodiment, an API is a specification of various functions or routines for the exchange and manipulation of data. For example, event API 202 may have a function which, when called by a subscriber, formats response message 118 to be sent to computing device 102. In an embodiment, the subscriber formats an HTTP POST request that identifies an intended computing device 102 or equipment 104 for the message and "calls" the API function at an address managed by event processing server 106. The message may include a URL and a priority level. Additionally, the API call may require an identification of a client that has authorized the subscriber to send messages to computing device 102 as well as an authorization key. The authorization key may be verified as discussed with respect to authentication module 206.

In various embodiments, network interface 210 is configured to communicate with computing device 102 using a proprietary transport protocol. In an embodiment, network interface 210 is configured to communicate with subscribers using an open protocol such as HTTP.

Figure 3:
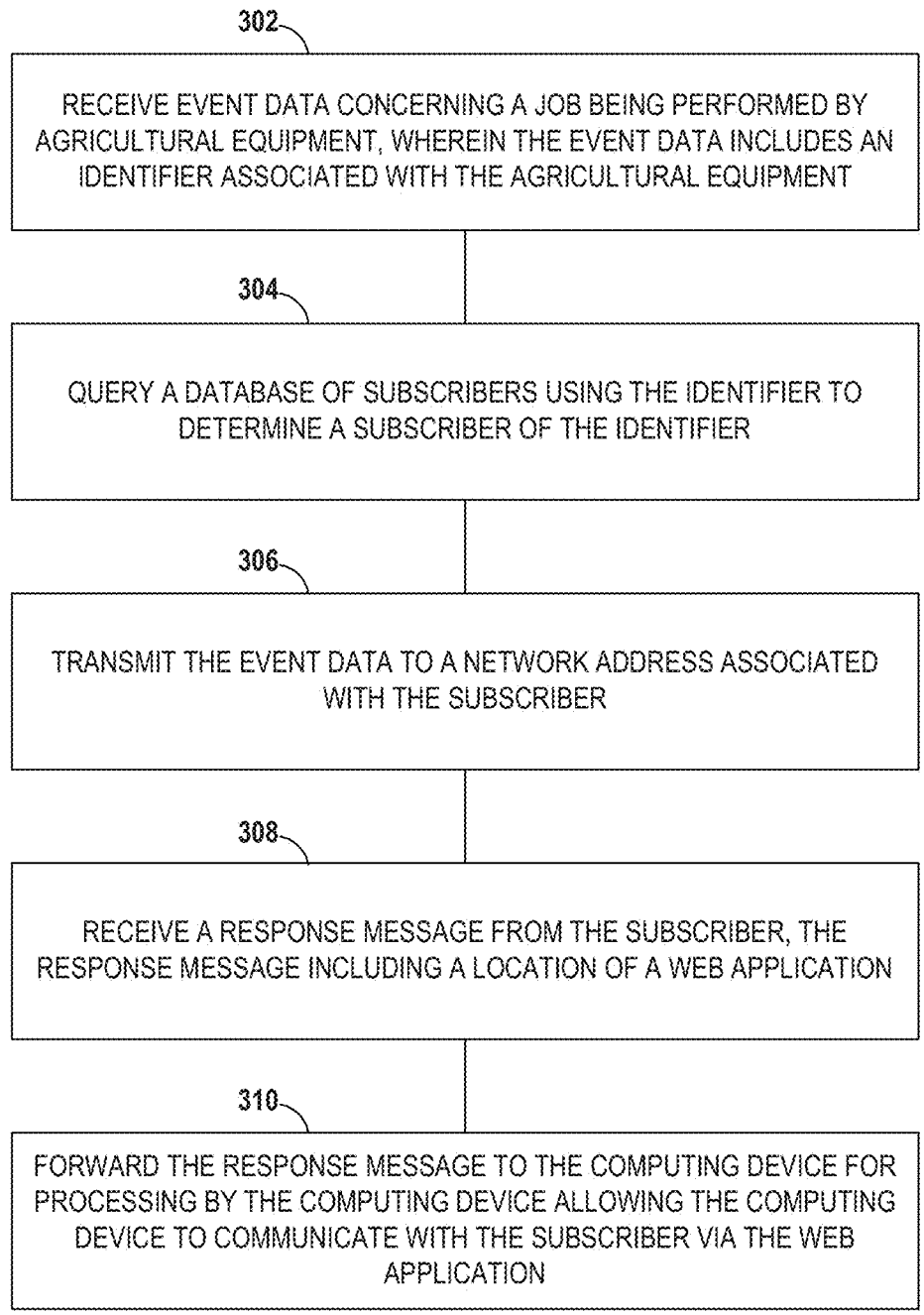
FIGS. 3 and 4 are flowcharts illustrating example methods, according to some embodiments.

FIG. 3 is a flowchart illustrating an example method of the disclosure herein, according to some embodiments.

At block 302, in an embodiment, an operation of receiving at a server, from a computing device associated with the agricultural equipment, event data concerning a job being performed by the agricultural equipment is performed. The event data may include an identifier of the agricultural equipment. In an embodiment, the server is event processing server 106.

The event data may include data that identifies a status of a job being performed with the piece of equipment. For example, the status may indicate a job has ended. The job status may have been set by an operator of the equipment via an input on the computing device. Event data may also include the status of the equipment. For example, the status may indicate the equipment will be powered off or is powered off.

At block 304, in an embodiment, an operation of querying, using at least one processor of the server, a database of subscribers using the identifier to determine a subscriber of the identifier is performed.

At block 306, in an embodiment, an operation of transmitting, from the server, the event data to a network address associated with the subscriber is performed.

At block 308, in an embodiment, an operation of receiving, at the server, a response message from the subscriber is performed. The response message may include a location (e.g., a URL) of the web application. The web application may provide information concerning a current job or a new job assignment if the event data indicates the current job has ended.

At block 310, in an embodiment, an operation of forwarding, from the server, the response message to the computing device is performed. The computing device may process the response message to access the URL and establish communication with a web application served at the URL thereby allowing the computing device to communicate with the subscriber via the web application. In an embodiment, the event data is received using a first transport protocol (e.g., a proprietary protocol) and the event data is transmitted using a second transport protocol (e.g., HTTP), the first and second transport protocols being different. Thus, in an embodiment, the subscriber cannot communicate with the computer device until the URL is transmitted to the computing device from the server.

In an embodiment, the server determines if the subscriber is authorized to send response messages to the computing device before the response message is forwarded. For example, the response message may include an authorization key that is verified.

Figure 4:
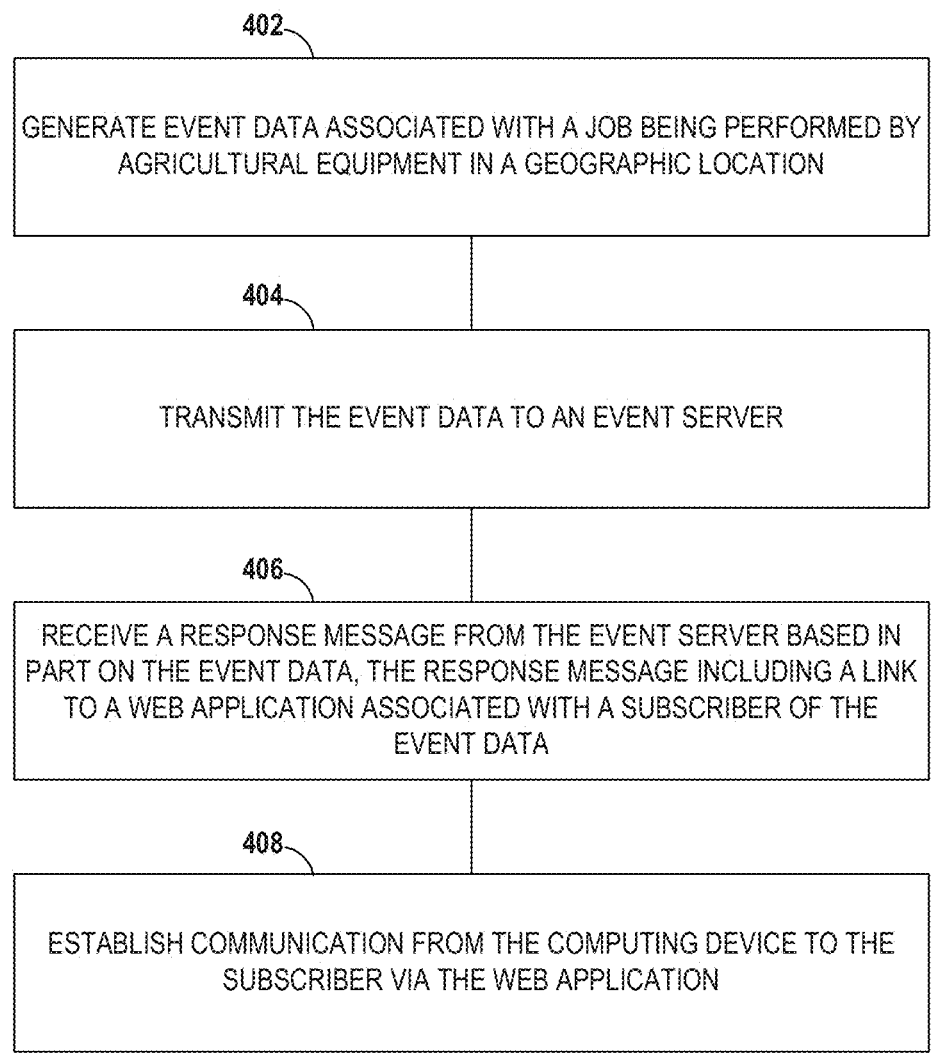

FIG. 4 is a flowchart illustrating an example method of the disclosure herein, according to some embodiments.

At block 402, in an embodiment, an operation of generating event data associated with a job being performed by a piece of agricultural equipment in a geographic location is performed.

Generating may include a computing device that monitors parameters of the equipment (e.g., fuel levels, rate of chemical being applied, power status of components). The computing device may be located proximate to the equipment. Proximate may mean that the computing device is within the equipment or located on the equipment such that if the equipment moves the computing device moves with the equipment.

The event data may include a job start notification indicating the piece of equipment is to begin a job in the geographic location. The indication of the job start may have been inputted into the computing device by an operator of the equipment. In an embodiment, the event data may include a low-fuel (e.g., fuel below a specified threshold) event associated with the piece of equipment.

At block 404, in an embodiment, an operation of transmitting, from the computing device, the event data to an event server is performed.

At block 406, in an embodiment, an operation of receiving, at the computing device, a response message from the event server based in part on the event data is performed. The response message may include a link (URL) to a web application associated with a subscriber of the event data. In an embodiment, a priority level is included in the response message.

At block 408, in an embodiment, an operation of establishing communication from the computing device to the subscriber via the web application is performed. In an embodiment, data from the URL (e.g., the web application) is displayed on a display device of the computing device when the priority level of the response message is greater than a threshold. The data may include a rate at which to apply a chemical in the geographic location.

Figure 5:
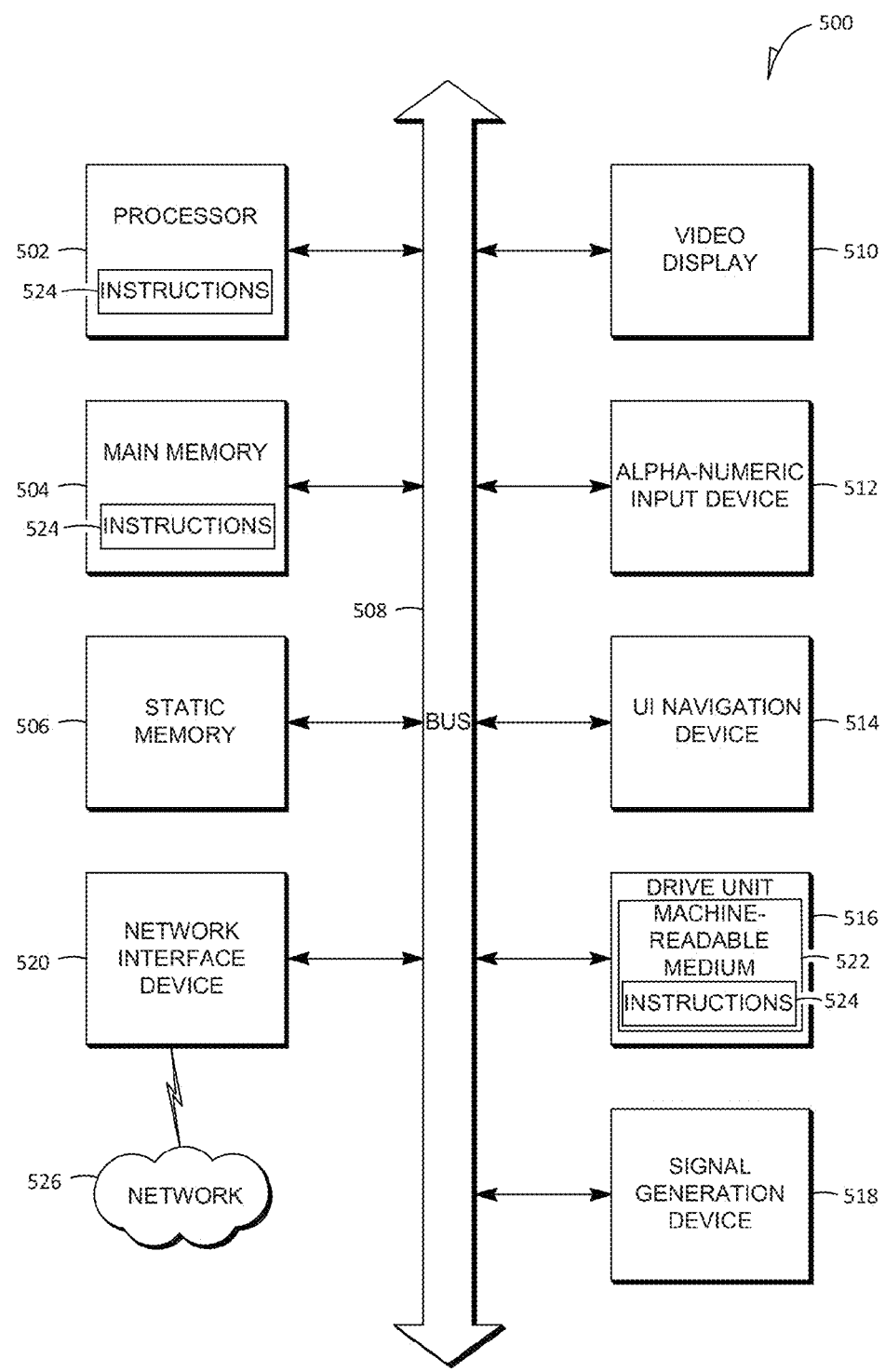
FIG. 5 shows a diagrammatic representation of a machine in the example form of a computer system within which a set of instructions may be executed to cause the machine to perform any one or more of the methodologies discussed herein.

FIG. 5 shows a diagrammatic representation of machine in the example form of a computer system 500 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions (e.g., storage device). The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving at a server, from a computing device located proximate to a piece of agricultural equipment, event data concerning a job being performed by the agricultural equipment, the event data including an identifier associated with the agricultural equipment;

querying, using at least one processor of the server, a database of subscribers using the identifier to determine a subscriber to the event data associated with the identifier and a uniform resource locator for the subscriber, wherein the subscriber is a web service;

transmitting, from the server, the event data to the uniform resource locator for the subscriber;

receiving, at the server, a response message from the web service, the response message including a uniform resource locator of a web application of the web service; and forwarding, from the server, the response message to the computing device for processing by the computing device allowing the computing device to display information from the subscriber on a display of the computing device via the web application.

2. The method of claim 1, wherein the event data identifies a status of the job being performed with the piece of agricultural equipment.

3. The method of claim 2, wherein status of the job indicates the job has ended.

4. The method of claim 3, wherein the response message includes a universal resource locator for the web application that presents a new job assignment for the piece of agricultural equipment.

5. The method of claim 1, wherein the event data includes data indicating the piece of agricultural equipment is to power off.

6. The method of claim 1, wherein the event data is received using a first transport protocol and the event data is transmitted using a second transport protocol, the first and second transport protocols being different.

7. The method of claim 1, further comprising determining, at the server, that the subscriber is authorized to transmit a response message to the computing device before forwarding the response message to the computing device.

8. The method of claim 7, wherein determining that the subscriber is authorized to transmit the response message to the computing device before forwarding the response message to the computing device comprises:

receiving an authentication key from the subscriber with the response message; and querying the subscriber database using the authentication key as an input to determine that the subscriber has been authorized for communication with the agricultural equipment.

9. The method of claim 8, further comprising:

receiving a request to revoke authorization of the subscriber; and in response to the revocation request, updating the subscriber database to indicate the subscriber's authorization has been revoked.

10. The method of claim 1, wherein the web application is a web page.

11. The method of claim 1, further comprising:

receiving a request from the subscriber to receive the event data, the request including an authorization key, the authorization key generated by an entity other than the subscriber.

12. The method claim 1, wherein transmitting, from the server, the event data to the uniform resource locator for the subscriber includes invoking an Application Programming Interface call.

13. A method comprising:

generating, using at least one processor of a computing device, event data associated with a job being performed by agricultural equipment in a geographic location, wherein the computing device is located proximate to the agricultural equipment;

transmitting, from the computing device, the event data to an event server;

receiving, at the computing device, a response message from the event server based in part on the event data, the response message including a uniform resource locator (URL) link to a web application associated with a subscriber of the event data;

establishing communication from the computing device to the subscriber via the web application; and displaying the web application on a display device of the computing device, and wherein the communication between the computing device and web application is performed using a first transport protocol and where the event data transmitted from the computing device to the event server uses a second transport protocol, the second transport protocol being different than the first transport protocol and the second transport protocol being a proprietary transport protocol.

14. The method of claim 13, wherein the response message includes a priority level.

15. The method of claim 14, wherein data from the URL is displayed on the display device of the computing device when the priority level of the response message is greater than a threshold.

16. The method of claim 13, wherein the event data includes a job start notification indicating the piece of equipment is to begin a job in the geographic location.

17. The method of claim 16, wherein data accessed at the URL includes a rate at which to apply a chemical in the geographic location.

18. The method of claim 13, wherein the event data includes a low-fuel event associated with the piece of equipment.

19. A machine-readable storage device storing instructions, which when executed by at least one processor, cause the at least one processor to perform operations comprising:

receiving at a server, from a computing device located proximate to a piece of agricultural equipment, event data concerning a job being performed by the agricultural equipment, the event data including an identifier associated with the agricultural equipment;

querying a database of subscribers using the identifier to determine a subscriber to the event data associated with the identifier and a uniform resource locator for the subscriber, wherein the subscriber is a web service;

transmitting, from the server, the event data to the uniform resource locator for the subscriber;

receiving, at the server, a response message from the web service, the response message including a uniform resource locator of a web application of the web service; and forwarding, from the server, the response message to the computing device for processing by the computing device allowing the computing device to display information from the subscriber on a display of the computing device via the web application.

* * * * *